United States Patent [19]

Tsuruta

[11] Patent Number: 4,566,947
[45] Date of Patent: Jan. 28, 1986

[54] METHOD OF SEPARATING A MIXED LIQUID INTO LIGHT AND HEAVY FRACTIONS BY DISTILLATION

[76] Inventor: Hidemasa Tsuruta, 1-19-15, Minamitokiwadai, Itabashi-ku, Tokyo, Japan

[21] Appl. No.: 684,712

[22] Filed: Dec. 21, 1984

Related U.S. Application Data

[62] Division of Ser. No. 424,561, Sep. 27, 1984, abandoned.

[51] Int. Cl.$^4$ .......................... B01D 3/14; B01D 1/28
[52] U.S. Cl. ........................................ 203/26; 203/14; 203/18; 203/76; 203/83; 203/DIG. 4; 203/DIG. 19; 203/98
[58] Field of Search .................... 203/26, 74, 81, 80, 203/14, 18, DIG. 4, 96, DIG. 19, 99, 98, 76, 83

[56] References Cited

U.S. PATENT DOCUMENTS

| | | | |
|---|---|---|---|
| 2,080,064 | 5/1937 | Roelfsema | 203/71 X |
| 2,166,584 | 7/1939 | Deanesly | 203/71 X |
| 2,277,115 | 3/1942 | Kruger | 203/71 X |
| 2,509,136 | 5/1950 | Cornell | 203/26 |
| 3,230,155 | 1/1966 | Schurch | 203/26 |
| 3,404,177 | 10/1968 | Baba et al. | 203/71 X |
| 3,438,870 | 4/1969 | Roscher et al. | 203/71 X |
| 4,177,111 | 12/1979 | Pieper et al. | 203/26 X |
| 4,374,705 | 2/1983 | Sawai et al. | 203/26 |
| 4,402,795 | 9/1983 | Erickson | 203/DIG. 4 |

Primary Examiner—Wilbur Bascomb
Attorney, Agent, or Firm—Pahl, Lorusso & Loud

[57] ABSTRACT

A two-stage distillation method for separating a mixed liquid such as a dimethylformamide-containing aqueous liquid or a methanol-containing aqueous liquid, into light and heavy fractions. The mixed liquid is first subjected to a distillation treatment in a first distillation zone of a vapor recompression type. When the boiling point of the mixed liquid is close to that of the desired light fraction, the top product from the first distillation zone is recovered as the light fraction, while the bottom product is subjected to a further distillation treatment to obtain the heavy fraction as its bottom product. When the boiling point of the mixed liquid is close to that of the heavy fraction, the bottom product from the first distillation zone is recovered as the heavy fraction, while the top product from the first distillation zone is subjected to a further distillation treatment to obtain the light fraction as its top product.

4 Claims, 5 Drawing Figures

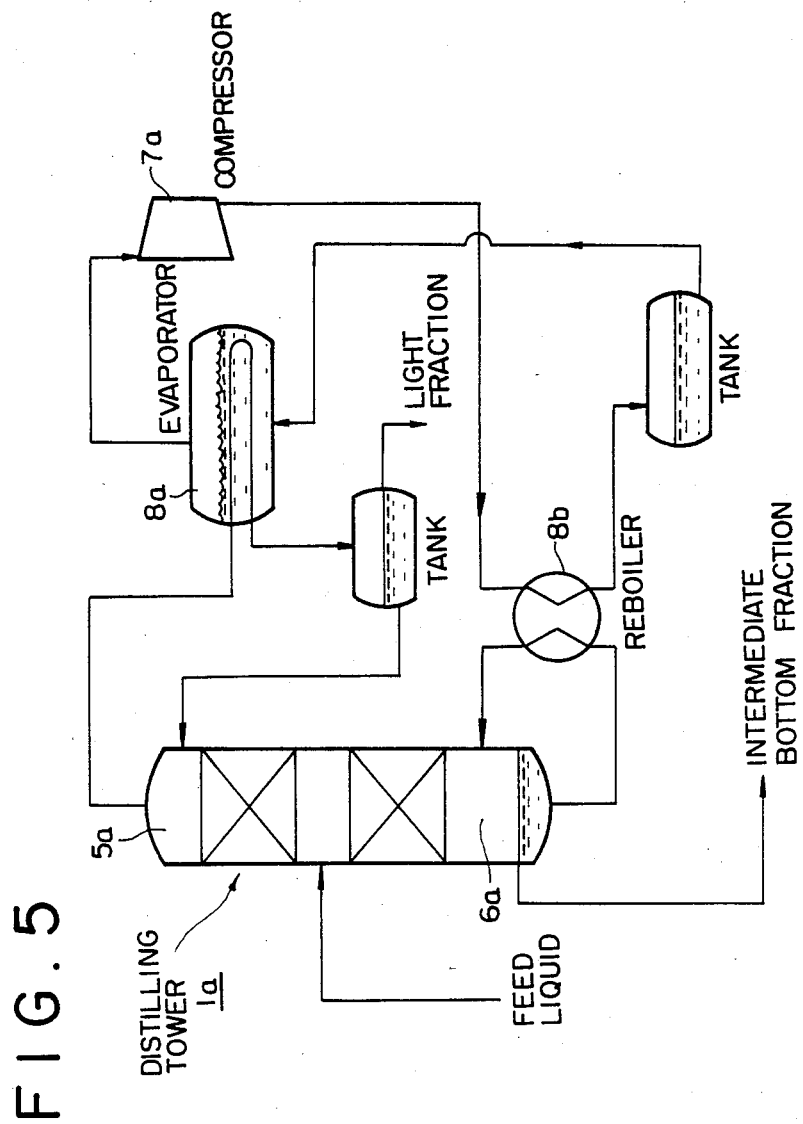
F I G. 5

METHOD OF SEPARATING A MIXED LIQUID INTO LIGHT AND HEAVY FRACTIONS BY DISTILLATION

This is a division of application Ser. No. 424,561 filed Sept. 27, 1984 and now abandoned.

BACKGROUND OF THE INVENTION (1) Field of the Invention

This invention relates to a method of separating a mixed liquid by rectification into light and heavy fractions with a difference in boiling point therebetween of at least 15° C.

(2) Description of the Prior Art

Dimethylformamide (hereinafter referred to simply as DMF) which is widely used in the production of synthetic fibers and resins, and in that case it is generally recovered in the form of a 10–20 wt % aqueous solution. In the Kraft pulp industry, the waste liquor which is discharged from a cooker and evaporator process contains about 0.5 wt % of methanol and other volatile substances. It is the general practice to resort to the distillation in the recovery of respective components from such a dilute liquid. However, since the object component or components exist in the liquid only in small concentrations, a large consumption of thermal energy is compelled in order to recover the desired component or components in a high concentration.

Meanwhile, there has been known in the art the so-called vapor recompression type distillation process for fractionating a liquid which consists of heavy and light components, wherein the vapor from the top of the tower, which is rich in the light component, is compressed by a compressor to a temperature level 5° to 10° C. higher than that of the bottom liquid, which is rich in the heavy component, the compressed vapor being fed to a reboiler for heating the bottom liquid by transferring the heat of condensation of the vapor to the bottom liquid, thereby to recover the entire quantity or a major proportion of the heat which is required for the distillation. This method, however, can be advantageously applicable only in a case where the difference in boiling point between the top and bottom fractions is small, because the power consumption by the compressor becomes larger with the increases in the $P_d/P_s$ ratio (a ratio of the pressure $P_d$ on the discarge side of the compressor to the pressure $P_s$ on its suction side). In this instance, the value $P_s$ is almost the same as the pressure at the tower top while the value $P_d$ is the pressure of the vapor of the tower top at a temperature which is the sum of the temperature of the bottom liquid plus the effective temperature difference at the heat transfer surface of the reboiler, so that the ratio $P_d/P_s$ is remarkably incresed with the increase in temperature difference between the tower top and the tower bottom. Thus, the vapor recompression type distillation, in which the heat required for the distillation results from the driving power of the compressor rather than from the thermal energy supplied from outside of the system, is generally applied advantageously only for the separation of the light fraction from the heavy fraction in which the difference in boiling point therebetween is smaller than 15° C. Accordingly, no attempt has ever been made to apply it to such a liquid which consists of components with large differences in boiling points like the abovementioned DMF-water or methanol-water system.

SUMMARY OF THE INVENTION

The present invention provides a method of separating a mixed liquid into a light fraction having a first boiling point and a heavy fraction having a second boiling point which is higher, under a given pressure, than the first boiling point by at least 15° C., preferably by at least 20° C. The method comprises, when the mixed liquid has a boiling point closer to the first boiling point than to the second boiling point, rectifying the mixed liquid in a first distillation zone of a vapor recompression type and operated at the given pressure in such a manner as to obtain the light fraction as its top product and an intermediate bottom fraction as its bottom product, the intermediate bottom fraction having a boiling point lower than the second boiling point but higher than the first boiling point by less than 20° C., preferably by less than 15° C. The intermediate bottom fraction is introduced into a second distillation zone operated with the use of the heat supplied from outside of the system so as to obtain the heavy fraction as its bottom product. The method of this invention, when the mixed liquid has a boiling point closer to the second boiling point than to the first boiling point, includes rectifying the mixed liquid in a first distillation zone of a vapor recompression type and operated at the given pressure in such a manner as to obtain the heavy fraction as its bottom product and an intermediate top fraction as its top product, the intermediate top fraction having a boiling point higher than the first boiling point but lower than the second boiling point by less than 20° C., preferably by less than 15° C. The intermediate top fraction is introduced into a second distillation zone operated with the use of a heat supplied from outside of the system so as to obtain the light fraction as its top product.

It is, therefore, a prime object of the present invention to provide an economical and energy-saving method for the separation, by distillation, of a mixed liquid into light and heavy fractions having a difference in boiling point therebetween of at least 15° C.

BRIEF DESCRIPTION OF THE INVENTION

Other objects, features and advantages of the present invention will become apparent from the detailed description of the invention which follows, when taken in light of the accompanying drawings, in which:

FIGS. 1–5 are schematic representations showing various systems for carrying out the method of this invention.

DETAILED DESCRIPTION OF THE INVENTION

Figure 1:
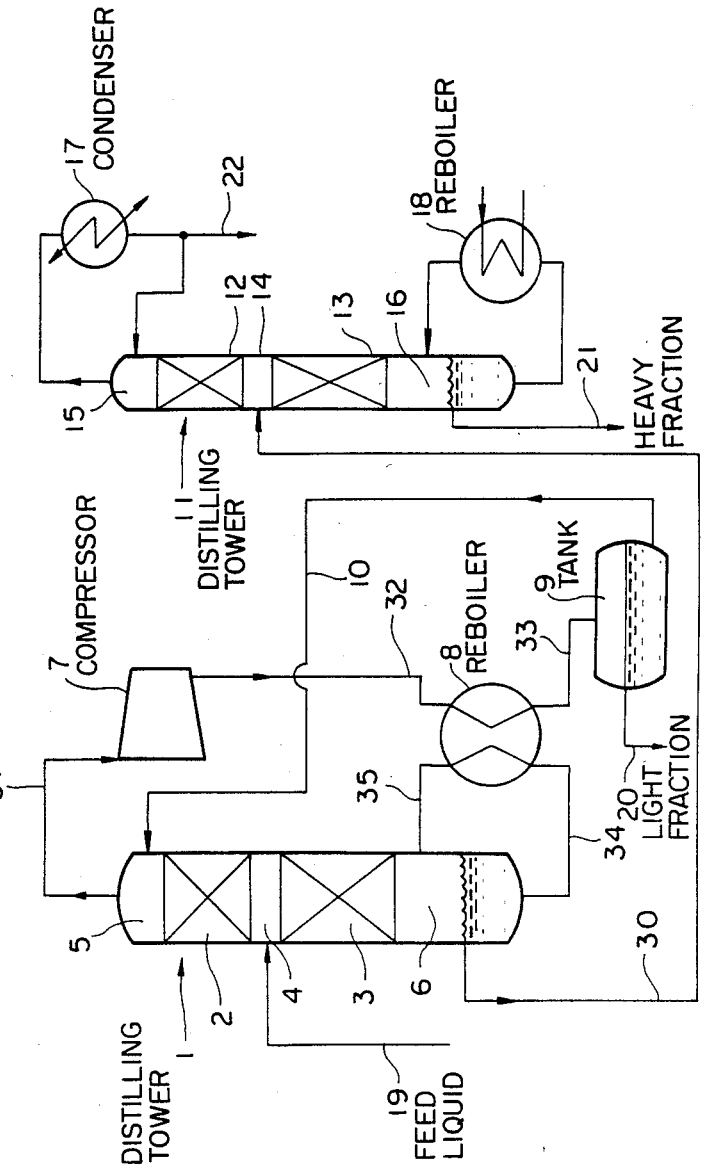

Referring first to FIG. 1, there is shown a distillation system useful for the separation of a mixed liquid into light and heavy fractions wherein the mixed liquid has a boiling point closer to that of the desired light fraction than to that of the desired heavy fraction. Designated generally as 1 is a first distillation zone or tower which is interiorly provided with a rectifying section 2 formed of a packed layer containing a packing material of a small pressure drop such as Sulzer packing (a product of Sulzer, Switzerland) or Intalox-Metal (a product of Norton, U.S.A.), a tower top 5 located over the rectifying section 2, a stripping section 3 formed of a packed layer of the same type of a packing material as shown above, a feed point 4 located between the rectifying and stripping sections, and a tower bottom 6 located beneath the stripping section 3. When the distillation in the first tower requires relatively small theoretical number of plates, the first tower may be arranged as a plate type tower instead of a packed tower.

The feed liquid is continuously supplied to the feed point 4 through a line 19 and rectified in the tower 1 to obtain the desired light fraction from the tower top 5 and an intermediate bottom fraction from the tower bottom 6. The vapor from the tower top is fed to the suction side of a compressor 7 and the thereby compressed vapor is then fed through a line 32 to a reboiler 8 for condensation therein. An after-condenser may be provided downstream of the reboiler to entirely condense the vapor. The condensed liquid is sent through a line 33 to a tank 9. A part of the liquid in the tank 9 is introduced into the tower top 5 through a line 10 for refluxing, while the remainder of the liquid in the tank 9 is recovered through a line 20 as the desired light fraction. The bottom liquid in the tower 1 is sent to the reboiler 8 through a line 34, where it is heated by receipt of the heat of condensation of the compressd vapor from the compressor 7, the heated bottom liquid being circulated to the tower bottom 6 through a line 35.

Generally indicated by the reference numeral 11 is a second distillation zone or tower which is, similar to the first tower 1, interiorly provided with a tower top 15, a rectifying section 12, a feed point 14, a stripping section 13, and a tower bottom 16. In this instance, however, it is not necessary to constitute the second tower 11 in the form of a packed tower. Even when a packed tower is adopted, it is not necessary to use a such a packing material having a small pressure drop as used in the first tower 1. Indicated at 17 is a condenser for condensing the vapor from the tower top 15, and at 18 a reboiler to which a heat is supplied from outside of the system for effecting the rectification in the second tower 11.

In the particular embodiment shown, the bottom liquid of the first tower 1, i.e. intermediate bottom fraction, is sent to the feed point 14 of the second tower 11 through a line 30. It is important that the boiling point of the intermediate bottom fraction should be lower than the second boiling point but should exceed beyond the first boiling point by no more than 20° C., preferably by no more than 15° C. By so doing, the distillation in the first tower 1 can be carried out more advantageously as compared with the customarily employed case where the bottom liquid is heated by application of heat from outside of the system. Further, a reduced quantity of heat is required for performing the distillation in the second tower 11, since the intermediate bottom fraction has been separated from a greater part of the light component, permitting the reduction in tower diameter and heat transfer areas of the condenser 17 and reboiler 18. The boiling point of the intermediate bottom fraction can be designed by properly setting the number of theoretical plates and the reflux ratio for the first tower 1.

The above-described method is now illustrated more particularly with respect to the separation of a feed liquid which consists of 85.5 wt % of water and 14.5 wt % of DMF, into a light fraction containing 0.4 wt % of DMF (balance being water) and a heavy fraction containing 0.05 wt % of water (balance being DMF). In this case, the boiling points of water, DMF, the light fraction and the feed liquid are 100° C., 153° C., 100.2° C. and 101.2° C., respectively, at atmospheric pressure. If the first tower is arranged so that the intermediate bottom fraction has a DMF concentration of 50 wt %, then the boiling point of the intermediate bottom fraction is 104.9° C. which is higher than the light fraction (100.2° C.) by 4.7° C. Since the elevation of the boiling point which occurs due to a pressure drop in the tower can be supressed to a value smaller than about 1° C. by the use of the packing material of a low pressure drop, the difference in temperature between the bottom 6 and the tower top 5 is about 5.7° C. at most.

Upon leaving the tower top, the mixed vapor consisting of 99.6 wt % of water and 0.4 wt % of DMF and providing the aimed light fraction is pressurized up to, for example, about 2.0 atms by the compressor 7. If necessary, water may be sprayed into the compressor 7 or the line 32 so as to prevent overheating by the adiabatic compression and at the same time to increase the amount of saturated steam. The vapor from the compressor 7, which has a temperature of, for example, about 120° C., is sent to the reboiler 8 to heat the bottom liquid fed from the tower bottom 6 by the heat of condensation. The heated liquid is recycled to the tower bottom 6, forming the ascending vapor in the tower 1. If necessary, an auxiliary reboiler may be provided adjacent to the bottom zone 6 to supply thereto a little quantity of heat in compensation of the heat loss and so on. The condensed liquid from the reboiler 8, which contains 0.4 wt % of DMF, is led to the tank 9. A part of the liquid in the tank 9 is recycled to the tower top 5 for refluxing and the remainder is recovered through a line 20 as the aimed light fraction. The liquid which has been collected through the line 20 can be used for heating the feed liquid of the line 19 by heat exchange therewith. The feed liquid may be introduced into the feed point 4 after evaporation, if desired.

The bottom liquid, i.e. intermediate bottom fraction, which contains 50 wt % of DMF after removal of about 82.4% of water from the original feed liquid is fed through the line 30 to the second tower 11 having a number of plates and a reflux ratio suitable for obtaining a top distillate liquid and the aimed heavy fraction containing 99.95 wt % of DMF. Cooling water is fed to the condenser 17 to condense the vapor from the tower top 15, refluxing part of the condensed liquid to the tower top 15 and collecting the remainder through the line 22. The collected liquid may be mixed with the feed liquid of the line 19, depending upon its DMF concentration. A portion of the liquid in the bottom 16 is continuously introduced into the reboiler 18 where it is heated by indirect heat exchange with the externally supplied heating medium. The heated liquid then returns to the bottom 16 to effect the rectification in the second distillation zone 11. The bottom liquid is discharged through a line 21 for recovery as the aimed heavy fraction.

Figure 2:
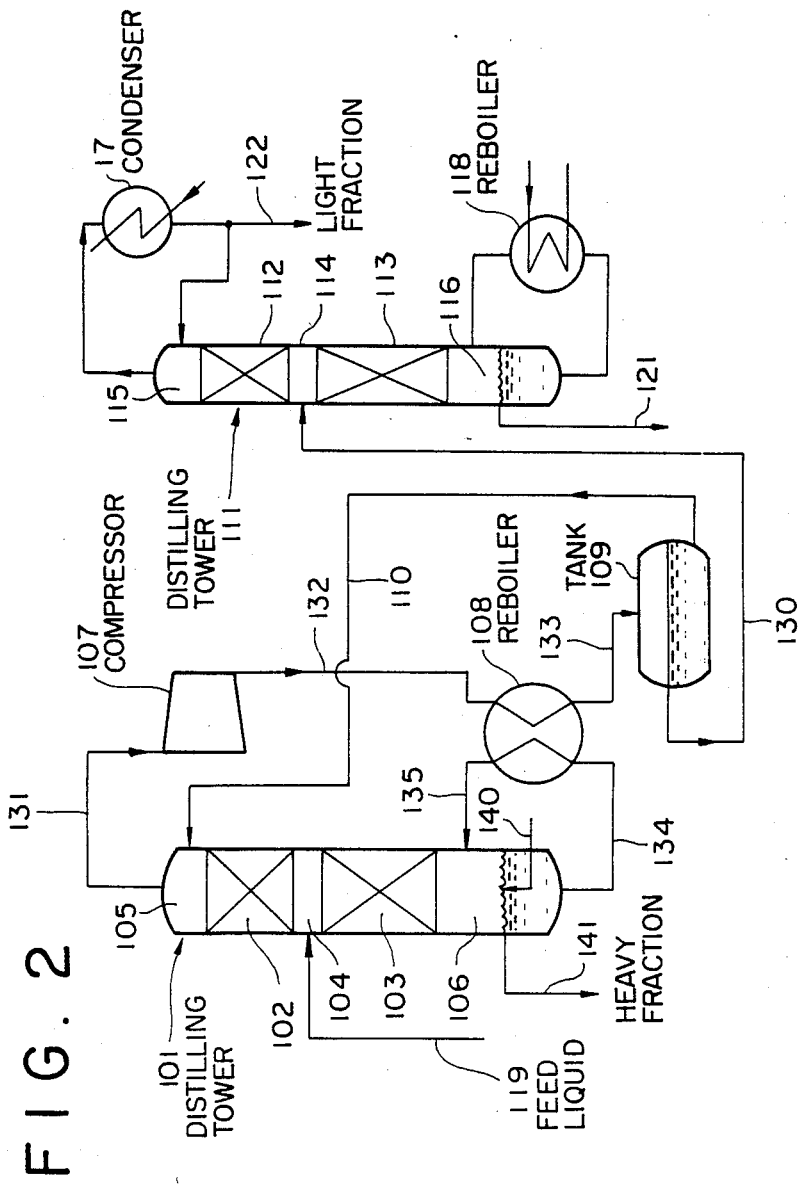

Referring now to FIG. 2, there is shown a system which is suitable for carrying out the method of the present invention in a case where the boiling point of the feed liquid is closer to that of the aimed heavy fraction than to that of the aimed light fraction, and in which the component parts common to FIG. 1 are designated by like reference numerals of 100 series. In this embodiment, the intermediate fraction obtained from the top of a tower 101 is fed to second tower 111 through line 130. It is important that the boiling point of the intermediate fraction should be higher than the first boiling point but lower than the second boiling point by less than 20° C., preferably by less than 15° C. By so doing, there can be obtained the same effects as mentioned hereinbefore in connection with FIG. 1. This can be done by adjusting the number of plates and the reflux ratio of the first tower 101.

Now, the description will be directed to an operation of the method of this invention for recovering 50.0 wt % methanol as a light fraction and 99.975 wt % water as a heavy fraction from a mixed liquid containing 0.5 wt % of methanol. In this instance, the boiling points of methanol, water, and the feed liquid are 64.7° C., 100° C. and 95.2° C., respectively at normal pressure. The boiling point of the aimed light ffraction is 76.1° C. at normal pressure, which is lower by about 24° C. than the aimed heavy fraction. If, however, the number of theoretical plates and the reflux ratio of the first tower 101 are adjusted so that the vapor from the tower top 105, which provides an intermediate top fraction, has a methanol concentration of, for example, 10.0 wt %, the boiling point of the intermediate fraction is 91.3° C. Since the bottom liquid (aimed heavy fraction) with a methanol concentration of 0.025 wt % has a boiling point of 99.9° C., the difference in boiling point between the aimed heavy fraction and the intermediate top fraction is only 8.6° C. Even if the elevation of the boiling point due to a pressure drop of the tower is taken into account, the temperature difference between the tower top 105 and tower bottom 106 is at most about 9° C., so that the vapor recompression type distillation can be applied advantageously in this case.

The vapor from the tower top 105, which contains 90 wt % of water and 10 wt % of methanol, is compressed by a compressor 107 and condensed in a reboiler 108 while heating the bottom liquid composed of 99.975 wt % of water and 0.025 wt % of methanol. The bottom liquid is recovered through a line 141 as the aimed heavy fraction. In order to utilize 100% of the latent heat of the compressed vapor in the condensing stage, it is necessary to raise to an extremely high level the pressure at the outlet of the compressor 107, resulting in an increased power consumption by the compressor. Therefore, a water-cooled condenser may be provided upstream of a tank 109 thereby to complete the condensation, without relying solely on a reboiler 108. In this case, steam may be fed to the tower bottom 106 through a line 140 to compensate for the deficiency in the quantity of heat which is required for the operation of the first tower 101. Although it is possible to employ an auxiliary reboiler as in the embodiment of FIG. 1, it is more economically advantageous to feed steam directly in a case where the bottom liquid is close to pure water.

The condensed liquor in the tank 109, i.e. intermediate top fraction, containing 10 wt % of methanol, is fed to a second tower 111 with a predetermined theoretical number of plates and a reflux ratio to recover water containing 50 wt % of methanol through a line 122 as the aimed light fraction, while recovering through a line 121 water containing methanol in a suitable concentration, for example, water containing 0.025 wt % of methanol. Depending upon the methanol concentration, the recovered water may be recycled to the feed liquid in a line 119.

Figure 3:
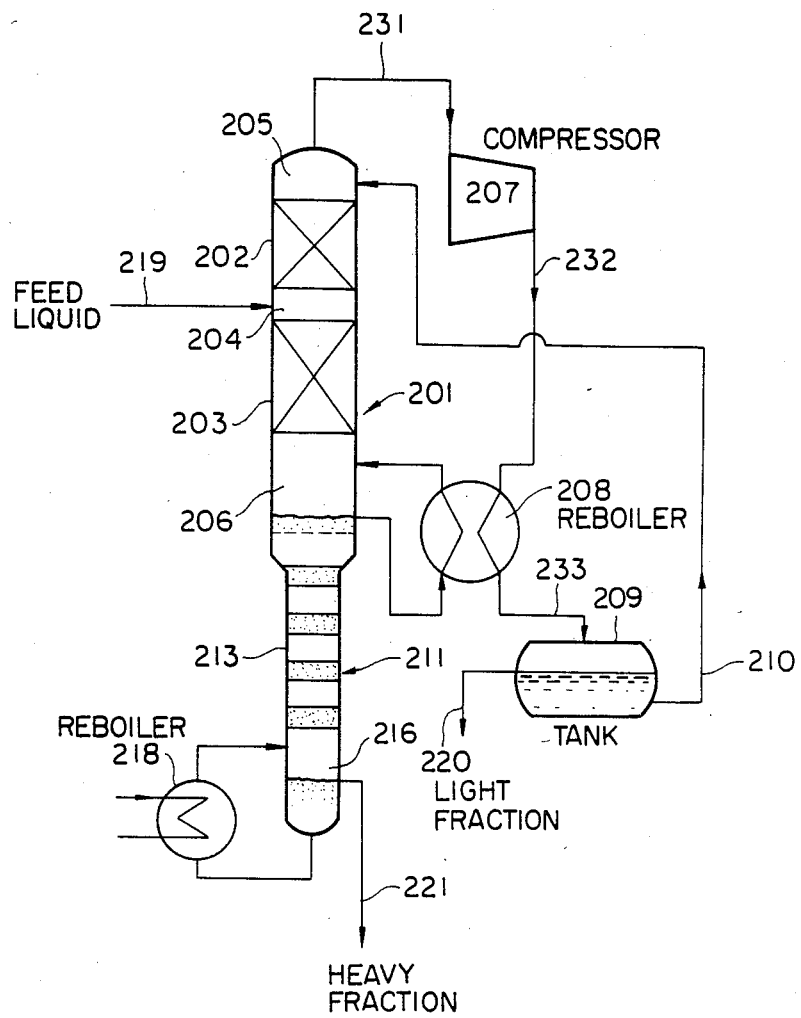

In a case where the first and second towers are operated under the same pressure in the foregoing embodiments, they can be integrated into a single tower system for the purpose of reducing the construction cost, floor space and operational cost. FIG. 3 illustrates a single tower system having the same function as that of the vapor recompression distillation system of FIG. 1, in which corresponding component parts are designated by corresponding reference numerals of 200 series.

A reflux liquid is fed through a line 210 to a tower top 205 of a first distillation zone 201 at a predetermined rate. The liquid loses its light component as it flows down through a rectifying section 202 and joins the feed liquid in a feed point 204. The joined liquid loses its light component during its passage through a stripping section 103 and reaches a tower bottom 206. Thereafter, the liquid flows down to a tower bottom 216 of a second distillation zone 211 through its stripping section 213. A portion of the liquid in the bottom 216 is introduced into a reboiler 218 for heating, while the remainder is recovered through a line 221 as the aimed heavy fraction. On the other hand, the vapor which is formed in the reboiler 218 ascends through the stripping section 213 while loosing its heavy component and, after joining the vapor from a reboiler 208 at the tower bottom 206, reaches the tower top 205. The vapor is then emitted overhead from the tower top through a line 231 and introduced into a compressor 207. The compressed vapor is then condensed in the reboiler 208 by heat exchange with the liquid from the tower bottom 206 and led into a tank 209. The liquid in the tank 209 is collected through a line 220 as the aimed light fraction except for that portion which is refluxed through the line 210 as mentioned hereinbefore. In a similar manner, the system of FIG. 2 can also be arranged into a single tower system.

In the foregoing embodiments, the vapor from the top of the first distillation tower is pressurized by a compressor to a temperature higher than the liquid in its bottom for heating same. Alternatively, the vapor from the tower top may be first introduced into an evaporator, connected to the suction side of a compressor, for evaporating a vaporizable liquid in the evaporator by indirect heat exchange with the vapor from the tower top. The vapor of the vaporizable liquid thus produced in the evaporator is continuously discharged by the compressor and utilized for the formation of ascending vapor in the first distillation tower and for effecting the rectification therein. In such a vapor recompression type distillation, the vapor of the vaporizable liquid may be introduced as such into the bottom of the first distillation tower for use as the ascending vapor therethrough, or may be introduced into a reboiler to indirect heat exchange with the liquid in the tower bottom and to form the ascending vapor.

Figure 4:
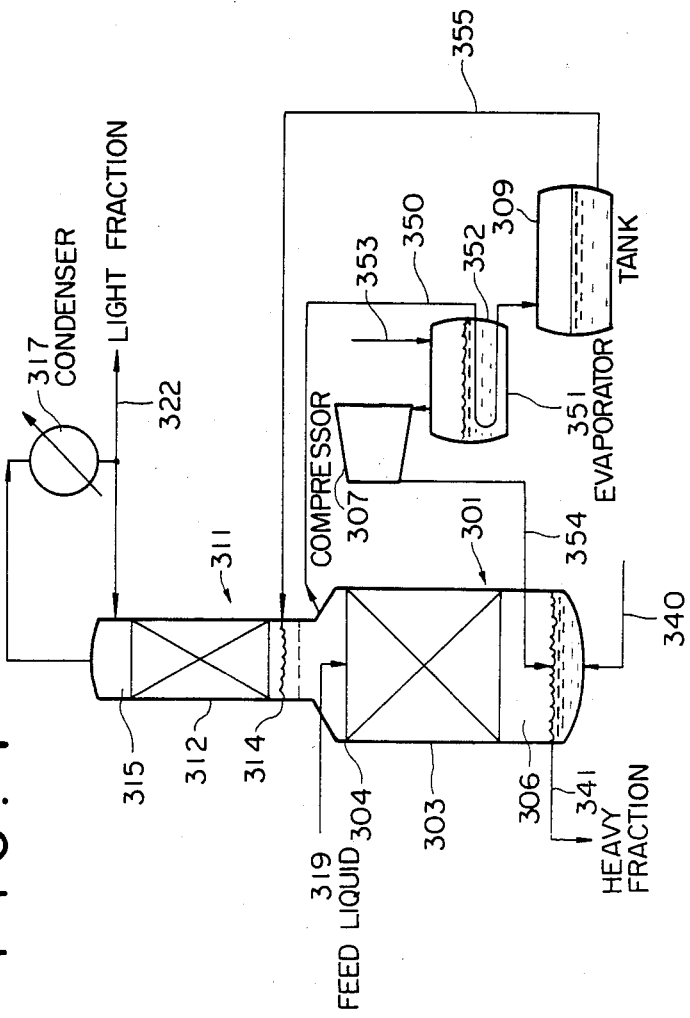

Reference is now had to FIG. 4 which is a schematic view of such an embodiment of the present invention as described immediately above, employing a single tower and in which the same components are designated by like reference numerals of 300 series. The method of FIG. 4 is explained by way of an operation for stripping ammonia from waste ammonia liquor discharged from coke ovens in the steel industries. Such an ammonia liquor generally contains about 0.3 wt % of ammonia. From the standpoint of prevention of pollution, the amount of ammonia contained in the heavy fraction produced by the distillation treatment is desired to be as small as possible, while the light fraction is desired to have an ammonia content of at least 80 wt % for the effective utilization thereof.

The ammonia liquor is fed through a line 319 to a feed point 304 positioned at the top section of a first distillation zone 301. While going down through a stripping section 303, the liquid is contacted with the ascending vapor from a tower bottom 306, whereupon ammonia is released by vaporization and returned upward. The bottom liquid with a predetermined ammonia concentration is discharged through a line 341 to recover the aimed heavy fraction. Normally, the liquids in the lines 319 and 314 are passed through a heat exchangeer (not shown).

The major portion of the vapor which leaves the feed point 304 after passage through the stripping section 303 and which contains ammonia in an amount of about 4 mol %, is passed through a reboiler 352 which is provided within an evaporator 351 to which is connected the suction side of a compressor 307. Through a line 353, the evaporator 351 is replenished with vaporizable liquid, in this case process water, to keep the liquid level constant. The temperature of the water in the evaporator 351 is governed by the pressure on the suction side of the vapor compressor 307. The heat transfer surface area and the average temperature difference across the heat transfer surface of the reboiler 352 are so designed as to effect the condensation of the vapor supplied through a line 350 and the evaporation of water in the evaporator 351.

The pressure of the vapor which has been sucked into the compressor 307 in this manner is increased to a level equivalent to that of the tower bottom 306 on the discharge side of the compressor 307, and blown into the tower bottom 306 through a line 354 to serve as a source of the ascending vapor as mentioned hereinbefore.

The condensed ammonia water from the reboiler 352 is once stored in a drum 309 as an intermediate top fraction and then fed through a line 355 to a feed point 314 beneath a rectifying section 312 of a second distillation zone 311 arranged above the first distillation zone 301. The vapor which remains uncondensed in the reboiler 352 may be fed to an intermediate portion of the rectifying section 312 (not shown). Fed also to the feed point 314 is the remainder of the ascending vapor which is diverted from the line 350. After the passage through the rectifying section 312, the vapor is discharged from the tower top 315 and is partly or entirely condensed in a condenser 317. A predetermined proportion of the condensed liquid is refluxed to the tower, while the remainder is taken out through a line 322 for recovery as the aimed light fraction. The refluxed liquid from the condenser 317 descends the rectifying section 312 while contacting with the ascending vapor and reaches the feed point 314. It then flows into the feed point 304 by overflowing. The vapor flown through the rectifying section 312 contains part of the vapor which has flown through the stripping section 303 as mentioned hereinbefore, and in this regard live steam may be supplied from outside of the system to the tower bottom through line 340 as an auxiliary heat source in addition to the evaporated steam from the evaporator 351 via compressor 307. The live steam is also utilized for the start-up of the system.

The method which employs a vapor compressor 307 in this manner is advantageous in a case where the feed liquid gives rise to precipitation of solid upon condensation of its volatile component or clogging with pitch-like material which would cause dangerous accidents or troublesome maintenance and service of the compressor. With the above-described arrangement, only the vapor from the evaporator passes the compressor 307, thus preventing the occurrence of such troubles. The interiors of the line 350 and the reboiler 352 can be maintained in clean state by the use of a suitable washing means. The foregoing method is advantageous especially when the bottom liquid is water, since it is possible to replenish through the line 353 cheap process water which does not require recovery. When the water which is collected at the tower bottom 306 does not contain substances which foul the inside of the compressor 307, it may be fed to the evaporator through the line 353 to keep the liquid level in the evaporator constant.

The method of the present invention is applicable not only to the above-mentioned dilute aqueous solutions of DMF, methanol and ammonia but also various other aqueous or non-aqueous mixed liquids such as a dilute aqueous ethanol solution and a mixed liquid of benzene and toluene. Besides, the mixed liquid may be constituted from more than two component. The first and second distillation zones may be operated either under a reduced pressure, atmospheric pressure or increased pressure condition depending upon the conditions involved.

In the above embodiment, the vapor produced in the evaporator 351 is directly fed, after being pressurized by the compressor 307, to the tower bottom 306. The system shown in FIG. 5 is a variant of such an embodiment and corresponds to the embodiment of FIG. 1. In this variant, the vapor produced in an evaporator 8a by indirect heat exchange with the vapor from a tower top 5a of a first distillation tower 1a, is fed, after being pressurized by a compressor 7a, to a reboiler 8b where it is indirectly heat exchanged with the liquid from a tower bottom 6a of the first tower 1a. The liquid formed in the reboiler 8b by condensation of the pressurized vapor may be recycled to the evaporator 8a. As the liquid recirculating between the reboiler 8b and the evaporator 8a, any suitable vaporizable liquid can be used such as water, ammonia, a hydrocarbon or a fluorinated hydrocarbon in consideration of the difference in temperature between the top and bottom of the tower 1a. Although this method is disadvantageous because of the use of the two heat exchangers 8a and 8b and the resulting increase in energy consumption in the compressor 7a as compared with the method shown in FIG. 1, this method is very effective when the vapor from the tower top 5a and the ascending vapor in the tower 1a are not suited to be pressurized in the compressor 7a for reason of their tendency to decompose or polymerize in the compressor 7a or to foul the inside of the compressor 7a.

According to the method of the present invention, a mixed liquid, which is comprised of components with a large difference in boiling point and which contains in a larger proportion either the component of a higher boiling point or a component of a lower boiling point, can be separated into light and heavy fractions with a minimized total energy consumption by firstly concentrating the liquid to a suitable concentration by utilizing the vapor recompression type distillation system and then distillating the concentrated liquid by the use of externally applied heat. The optimum concentration of (or boiling point) of such intermediate concentrated liquid (intermediate bottom fraction or intermediate top fraction) is determined comprehensively based on various factors such as the composition of the feed liquid, the final concentration of the aimed fractions, unit cost of the power required for the compressor, unit cost of the externally applied thermal energy, etc.

The following examples will further illustrate the present invention.

EXAMPLE 1

A mixed liquid containing 15.1 wt % of DMF (and the balance of $H_2O$) was processed by the distillation system as shown in FIG. 1 to obtain 99.95 wt % DMF (the balance being $H_2O$) from the bottom of the second tower, 99.6 wt % water (the balance being DMF) from the top of the first tower, and 84.9 wt % water (the balance being DMF) from the top of the second tower. The theoretical number of plates of the first tower was varied such that the difference of the top and bottom temperatures was 5.4° C. in Case 1 (water removal rate: 82.3%) and 10.1° C. in Case 2 (water removal rate: 92.4%). Table 1 below shows the operating conditions of the first and second towers along with consumption of steam and power. For the purpose of comparison, there are also shown estimated values which would be obtained by an ordinary method which employs a single distillating tower operated with externally applied heat in a manner different from the method of the present invention.

TABLE 1

DMF-$H_2O$ Distillation

| | Unit | Case 1 | Case 2 | Ordinary Method (single tower) |
|---|---|---|---|---|
| [1st Tower] | | | | |
| Water removal rate | % | 82.3 | 92.4 | — |
| Pressure at tower top | Atm | 1.0 | 1.0 | — |
| Total theoretical number of plates | — | 14.8 | 15.5 | — |
| Reflux ratio | — | 0.76 | 0.76 | — |
| Internal pressure drop | mmHg | 19.3 | 20.2 | — |
| Temp. difference caused by pressure drop | °C. | 0.70 | 0.74 | — |
| Temp. at tower top | °C. | 100.2 | 100.2 | — |
| Temp. at tower bottom | °C. | 105.6 | 110.3 | — |
| Temp. difference in reboiler | °C. | 10.0 | 10.0 | — |
| Discharge pressure of compressor | Atm | 1.71 | 1.82 | — |
| Compressor power consumption | kwh/t-DMF | 319 | 469 | — |
| [2nd Tower] | | | | |
| Pressure at tower top | Atm | 0.105 | 0.015 | 0.015 |
| Total theoretical number of plates | — | 8.4 | 9.0 | 20.0 |
| Reflux ratio | — | 0.27 | 0.52 | 0.76 |
| Temp. at tower top | °C. | 46.6 | 46.6 | 47.2 |
| Temp. at tower bottom | °C. | 90.2 | 90.2 | 90.2 |
| Heat applied | $10^6$ kcal/t-DMF | 0.70 | 0.36 | 5.37 |

The foregoing data are based on the conditions that the overall electric and mechanical efficiency of the compressor is 70%, no heat is replenished in compensation for the loss in heating by the reboiler, and the feed liquid is suitably heated to its boiling point before feeding to the tower.

If the energy consumption requires, for example, 20 yen per electric power of 1 kwh and 5000 yen per ton of heating vapor, the energy cost (the total expense for the required quantity of heat and power) is as small as 13.2 yen and 12.9 yen in Case 1 and Case 2, respectively, in contrast to the ordinary single tower method in which it amounts to 52.5 yen. Thus, the method of the present invention which can cut the energy cost to about ¼ has a great economical advantage.

EXAMPLE 2

An aqueous solution containing 0.50 wt % of methanol (the balance being $H_2O$) was processed by a distillation system as shown in FIG. 2 to obtain 99.975% water (the balance being methanol) from the bottom of the first tower, 99.5 wt % water (the balance being methanol) from the bottom of the second tower, and 90.0% methanol (the balance being water) from the top of the second tower. The theoretical number of plates of the first tower was varied such that the difference between its top and bottom temperatures was 5.1° C. in Case 3 (water removal rate: 90%) and 9.0° C. in Case 4 (water removal rate 95.5%). Table 2 shows the vapor and power consumptions in these cases along with estimated values which would be obtained by an ordinary single tower method for the purpose of comparison.

TABLE 2

Methanol-$H_2O$ Distillation

| | Unit | Case 3 | Case 4 | Ordinary Method (single tower) |
|---|---|---|---|---|
| [1st Tower] | | | | |
| Tower top pressure | Atm | 1.0 | 1.0 | — |
| Total theoretical number of plates | — | 8.1 | 8.2 | — |
| Externally applied heat | 10 Kcal/t-feed liquid | 0.84 | 1.04 | — |
| Reboiler heat transfer surface area | m²/t-feed liquid/h | 8.0 | 9.3 | — |
| Reflux ratio | — | 0.41 | 2.3 | — |
| Internal pressure drop | mmHg | 10.6 | 10.7 | — |
| Temp. difference due to pressure drop | °C. | 0.39 | 0.39 | — |
| Temp. at tower top | °C. | 95.2 | 91.3 | — |
| Temp. at tower bottom | °C. | 100.3 | 100.3 | — |
| Temp. difference in reboiler | °C. | 9.9 | 8.3 | — |
| Compressor discharge pressure | Atm | 1.60 | 1.80 | — |
| Compressor power consumption | KWH/t-feed liquid | 4.46 | 6.51 | — |
| [2nd Tower] | | | | |
| Pressure at tower top | Atm | 1.0 | 1.0 | 1.0 |
| Total theoretical number of plates | — | 7.8 | 7.8 | 9.8 |
| Reflux ratio | — | 6.6 | 4.5 | 54.1 |
| Temp. at tower top | °C. | 70.7 | 70.7 | 70.7 |
| Temp. at tower bottom | °C. | 99.4 | 99.4 | 99.9 |
| Externally applied heat | $10^4$ kcal/t-feed liquid | 1.30 | 0.99 | 9.54 |

The efficiency of the compressor and other conditions were same as in Example 1. The energy costs per ton of the feed liquid in Case 3 and Case 4, as calculated from the respective energy consumptions based on the same unit prices as in Example 1, are 297 yen and 327 yen per ton of feed liquid, respectively, in contrast to 925 yen of the ordinary single tower method. Thus, the method of the present invention which can cut the energy cost to about ⅓ has a great economical advantage.

EXAMPLE 3

According to the flow sheet of FIG. 4, a waste ammonia liquor containing 0.3 wt % of ammonia was stripped, obtaining 79 wt % ammonia water from the tower top 322 and 0.02 wt % ammonia water from the tower bottom 341. The feed liquid was added with NaOH beforehand to adjust its pH to 9.8, thereby releasing fixed ammonia substantially into free state, and sediments and tarry matters were filtered off. The conditions and the results of the stripping are shown in Table 3.

TABLE 3

| | Unit | Two-stage distillation | One-stage distillation (ordinary method) |
|---|---|---|---|
| [1st Tower] | | | |
| Rate of ascending vapor through stripping section/feed liquid | | 0.091 | — |
| Theoretical number of plates of stripping section | — | 7.4 | — |
| Temp. of feed point (304) | °C. | 99.0 | — |
| Temp. of tower bottom (341) (aimed heavy fraction) | °C. | 102.4 | — |
| Temp. difference | °C. | 3.4 | — |
| Temp. of evaporator | °C. | 87.4 | — |
| Compression ratio | — | 1.73 | — |
| Rate of vaporization | kg/t-feed liquid | 79.0 | — |
| Auxiliary steam feed rate | kg/t-feed liquid | 34.0 | — |
| Electric power | kw/t-feed liquid | 2.79 | — |
| [2nd Tower] | | | |
| Minimum reflux ratio | — | 1.59 | 22.4 |
| Actual reflux ratio | — | 2.38 | 33.6 |
| Total theoretical number of plates of upper and lower towers | — | 13.50 | 9.8 |
| Rate of ascending vapor/feed liquid | — | 0.011 | 0.115 |
| Temp. at tower top (315) (Aimed light fraction) | °C. | 52.2 | 52.2 |
| Temp. at tower bottom (314) | °C. | 87.5 | 103.8 |
| Steam feed rate (340) | kg/t-feed liquid | 11.8 | 120.0 |
| Electric power | kw/t-feed liquid | — | 0.18 |
| Total energy consumption steam | kg/t-feed liquid | 45.8 | 120.0 |
| Electric power | kw/t-feed liquid | 2.80 | 0.18 |

If the unit costs of steam and electric power are 5 yen/kg and 20 yen/kw, respectively, the total energy cost amounts to as high as 604 yen/ton of feed liquid with the ordinary single tower process, in contrast to the process of this invention with which the total energy cost is 285 yen/ton of the feed liquid, only 47% of the ordinary process. With the method of this invention, it is possible to reduce the energy cost further by varying the compression ratio and the heat transfer surface area of the reboiler.

I claim:

1. A method of separating a mixed liquid into a light fraction having a first boiling point and heavy fraction having a second boiling point which is higher, under a given pressure than said first boiling point by at least 15° C., said mixed liquid having a boiling point nearer said second boiling point than said first boiling point, said method comprising:
   rectifying said mixed liquid in a first distillation zone operated at said given pressure in such a manner as to obtain said heavy fraction as its bottom product and an intermediate fraction as its top product, said intermediate fraction having a boiling point higher than said first boiling point but lower than said second boiling point by less than 20° C.,
   introducing said intermediate fraction into an evaporator for vaporizing a vaporizable liquid by indirect heat exchange therewith, thereby obtaining a vapor of said vaporizable liquid with the simultaneous condensation of said intermediate fraction,
   compressing the vapor of said vaporizable liquid to a temperature higher than that of said heavy fraction in said first zone,
   heating said heavy fraction in said first distillation zone by heat exchange with said compressed vapor to effect said rectification in said first distilllation zone, and
   distilling said condensed intermediate fraction in a second distillation zone operated so as to obtain said light fraction as its top product.

2. A method according to claim 1, wherein said heating of said heavy fraction includes circulating said heavy fraction in said first distillation zone through a reboiler to which said compressed vapor is fed for indirect heat exchange with said heavy fraction.

3. A method according to claim 1, wherein said heating of said heavy fraction is by introducing said compressed vapor into said first distillation zone for direct contact with the said heavy fraction in said first distillation zone.

4. A method according to claim 1 wherein said vaporizable liquid is water.

* * * * *

UNITED STATES PATENT AND TRADEMARK OFFICE
CERTIFICATE OF CORRECTION

PATENT NO. : 4,566,947
DATED : January 28, 1986
INVENTOR(S) : Hidemasa TSURUTA

It is certified that error appears in the above—identified patent and that said Letters Patent is hereby corrected as shown below:

On the face of the patent add:

--Foreign Application Priority Data

December 14, 1981 [JP]    Japan ..................56-201363--;

Column 5, line 10, "ffraction" should read --fraction--; and

Column 6, line 7, "103" should read --203--.

Signed and Sealed this

Fifth Day of August 1986

[SEAL]

Attest:

DONALD J. QUIGG

Attesting Officer    Commissioner of Patents and Trademarks